Patented Oct. 5, 1937

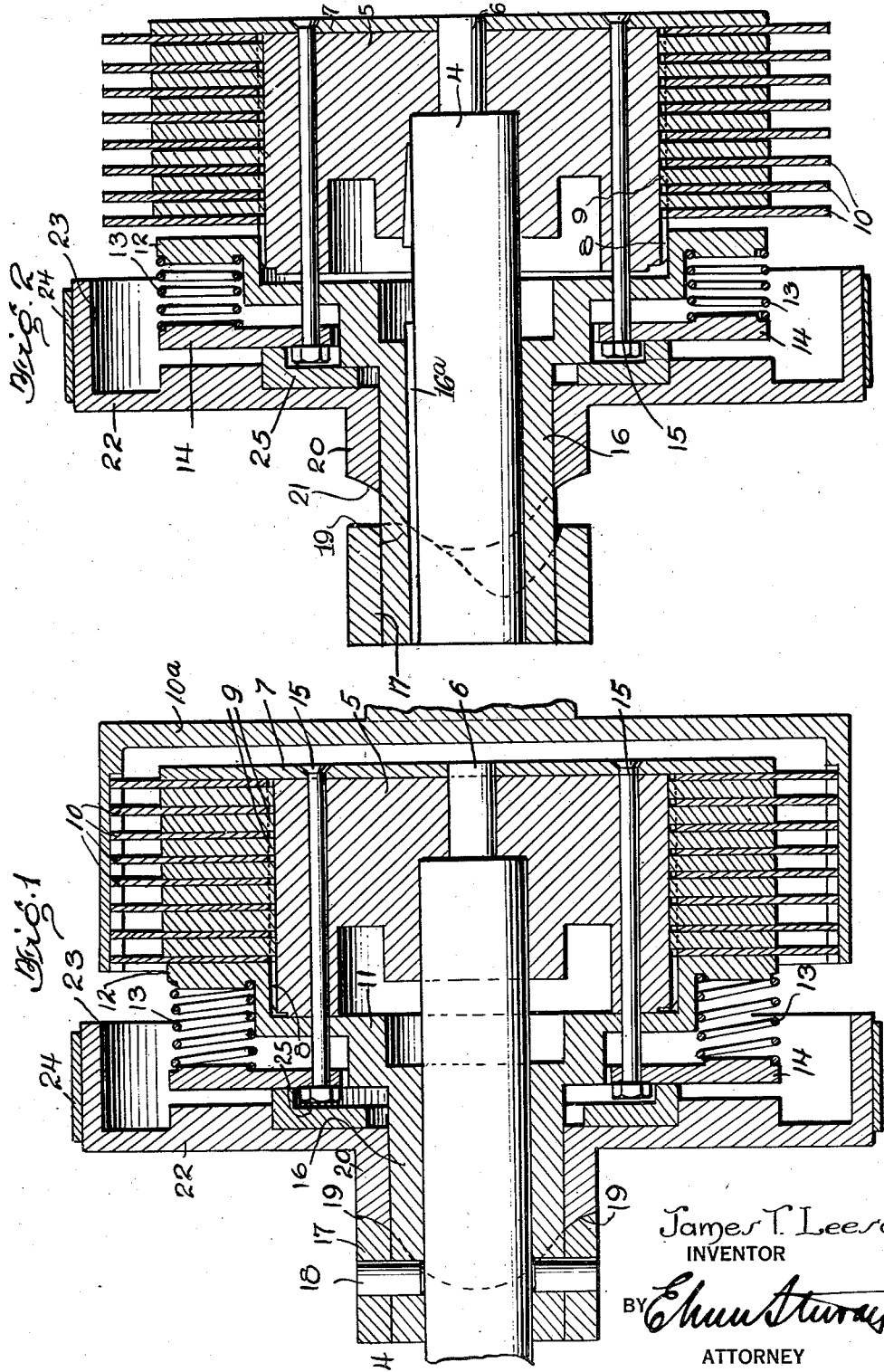

2,095,140

UNITED STATES PATENT OFFICE 2,095,140

TRACTOR STEERING CLUTCH

James T. Leeson, Rocky Mount, N. C.

Application August 21, 1935, Serial No. 37,215

4 Claims. (Cl. 192—36)

The invention to which the following description relates is in a steering clutch for tractors or like vehicles. Specifically, tractors of this type are controlled by partially or wholly disconnecting or unclutching one of the tractor wheels from the power plant and thus preventing this wheel from driving with the same force as the other wheel. It follows that the partially or wholly disconnected wheel serves as a pivot around which the tractor turns or the latter may simply be caused to follow a curved path with the disconnected wheel on the inner side of the path.

The specific object of my invention is to design these clutches so that they may operate without levers, clutch collars or throw-out bearings and thus simplify the device and improve its operating ability.

Among the objects of my invention is to release the friction clutch by applying a braking force upon one of the moving parts and thus cause the clutch parts to separate.

It is also an object of my invention to provide a clutch operating means which is interchangeable, will operate in either direction of the shaft's rotation and can be economically assembled and operated.

Other objects of my invention will follow from the description as illustrated in the accompanying drawing in which Fig. 1 is a longitudinal section of the steering clutch engaged and Fig. 2 is a corresponding view of the same clutch when disengaged.

The preferred form of my invention has been illustrated to be mounted in keyed arrangement on the end of a driven shaft 4. This shaft carries on its end a clutch base 5. This base 5 forms a thrust block over the end of the shaft 4. It has a central recess 6 which is enlarged to receive the end of the shaft 4 and form a pilot bearing. The shaft 4 and the base 5 are keyed together in the usual manner.

The free end of the base 5 carries an abutment plate 7.

The outer periphery of the base 5 is grooved to form a series of ribs 8. These ribs 8 carry a series of friction rings 9 which are thus constrained to rotate with the base or clutch part 5.

Alternating between the several friction rings 9 and between the latter and the abutment plate 7 is a series of friction plates 10. These plates have center openings circular in form and of greater diameter than the overall diameter of the base 5 with the ribs 8. The plates 10 are connected in the usual manner to a driving member 10a of the clutch.

A pressure plate 11 is correspondingly keyed in sliding engagement on the driven shaft 4. This pressure plate is stepped in cross-section as shown in the drawing and has an outer flange 12 which surrounds the ribs 8 loosely. The flange 12 rests against the end plate of the series 10. Friction surfaces are provided either on the sides of the rings 9 or the plates 10. In this manner pressure exerted on the flange 12 clamps the rings 9 and plates 10 with a firm grip so that rotation from the driving member is transmitted through the plates 10 to the rings 9 thence to the driven member of the clutch.

The pressure plate is held firmly against the series of rings and plates by means of a number of coil compression springs 13. These springs are uniformly distributed around the flange 12. They are supported at the opposite ends by a ring 14. This ring is loosely carried on a series of bolts 15 running through the base 5. By means of the ring 14 and springs 13 the parts of the clutch are normally maintained in driving engagement.

While I have shown and described for purposes of illustration one form of a multiple plate clutch which is to be operated by my invention, still this has been done solely for the purpose of example and other forms of clutches may of course be substituted.

The pressure plate 11 has a sleeve 16 slidable on the shaft 4 in a known manner as by key 16a.

The outer end of the sleeve 16 is fitted with a curved cam track 17. This cam track is held on the sleeve 16 by means of studs 18. The surface of the cam track consists in two opposed elevations 19, and symmetrical opposed depressions of the same curvature.

Intermediate the pressure plate 11 and the cam track 17, the sleeve carries a collar 20. This collar is free to rotate on the sleeve 16. The end of the collar 20 is formed with a cam 21 identical with the cam track 17. That is, the elevation of one will fit the depression of the other.

The opposite end of the collar 20 has a brake drum 22, the outer periphery of which has a braking surface 23. This braking surface is adapted to be held by a brake band or strap 24 when it is desired to release the clutch.

A washer or similar spacing member 25 fits in a depression within the brake drum 22 and serves to hold the brake drum 22 suitably spaced from the ring 14.

From the above description it will be apparent that so long as the brake drum 22 and its collar 20 are free to rotate with the sleeve 16 the springs 13 urging the flange 12 toward the clutch will also serve to bring the cam track 17 close against the cam 21. In other words, the compression applied upon the plates and rings of the clutch serves also to cause the brake drum to rotate with the cam and cam track in engagement. When it is desired to release the driven member from the driving member it is only necessary to apply slight friction from the brake band 24 to the drum 23. The resulting drag on the cam 21 serves to separate it from the cam track 17. A very slight movement of the cam and cam track will be sufficient to pull back the pressure plate 11 with its flange 12 compressing springs 13. The plates of the friction clutch will, therefore, slip to the extent desired and driving efforts may be selectively applied in varying degrees to the opposite tractor or driven elements of the vehicle. In this way a curved path of any desired radius may be followed.

When, however, it is desired to make the vehicle turn sharply on one traction wheel only, the clutch applying to the opposite traction wheel will be completely disengaged. This results from holding the brake drum firmly by the brake band 24 and allowing the peaks 19 of the cam and cam track to approach in the position shown in Fig. 2. Under such circumstances the pressure plate 12 is retracted as far as possible until it strikes the spacing member 25 as shown in Fig. 2. The shaft 4 is then free from driving effort. In accomplishing this result the drum 23 thus serves as a distinct mechanical brake on the driven shaft 4, the effort being applied through the interlocked cams 21 and 19 and keyed sleeve 16.

Release of the braking effort between the brake band 24 and drum 23 will allow the cam 21 to rotate in reversed direction until its peaks are within the depressions of the cam track 17.

In this movement the sleeve 16 is urged inwardly by springs 13 and the friction clutch again reengaged.

It is evident that this form of clutch will operate in either direction of rotation. It is also extremely simple and rugged. It will permit variations in the amount of driving effort applied by the driving element to the driven shaft 4.

The absence of throw-out bearings, collars and levers makes this form of steering clutch extremely advantageous.

While I have shown the preferred form of my invention, it may be modified by change in minor details within the scope of the invention defined in the following claims.

What I claim is:

1. A steering clutch comprising a driving member, a shaft, a driven member keyed to the shaft, interengaging clutch elements carried by said driven member, a clutch operating member slidable on the shaft, spring means for applying pressure from said clutch operating member to the clutch elements, a cam track on the clutch operating member, a complementary cam loosely journaled on the clutch operating member and means for causing the cam to be moved relatively to the cam track.

2. A steering clutch comprising a driving member, a shaft, a driven member keyed to the shaft, interengaging clutch elements carried by said member, a pressure plate slidably keyed on the shaft, spring means for applying pressure from said plate to the clutch elements, a cam track on the pressure plate, a complementary cam loosely journaled on the pressure plate, and brake means for causing the cam to be moved relatively to the cam track.

3. A steering clutch comprising a driving member, a shaft, a driven member keyed to the shaft, interengaging clutch elements carried by said members, a clutch operating member slidable on the shaft, spring means for applying pressure from said clutch operating member to the clutch elements, a cam track on the clutch operating member, a complementary cam loosely journaled on the clutch operating member and means for retracting the clutch operating member by the change in relative positions of the cam and cam track.

4. A steering clutch comprising a driving member, a shaft, a driven member keyed to the shaft, interengaging clutch elements carried by said members, a pressure plate slidable on the shaft, a ring attached to the driven member, a series of coil springs extending between the plate and ring, a sleeve on the plate and surrounding the shaft, a cam track on the free end of the sleeve, a collar loosely journalled on the sleeve, a cam on the end of the collar, and braking means for the collar.

JAMES T. LEESON.